Oct. 1, 1968  F. W. BROOKE  3,404,209
FURNACE CONSTRUCTION AND UTILIZATION
Filed May 25, 1965  7 Sheets-Sheet 1

INVENTOR.
Frank W. Brooke

BY *Green, McCallister & Miller*

HIS ATTORNEYS

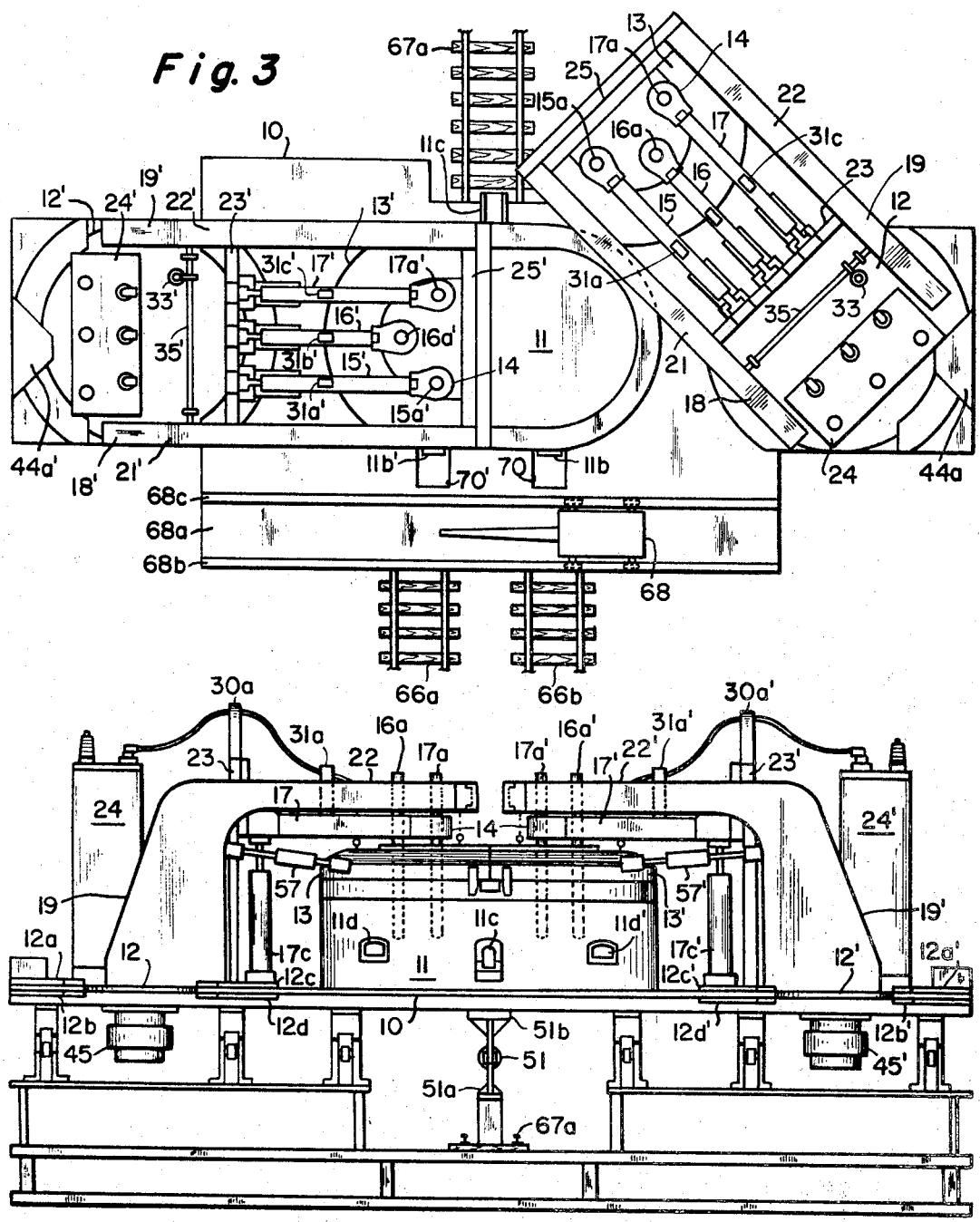

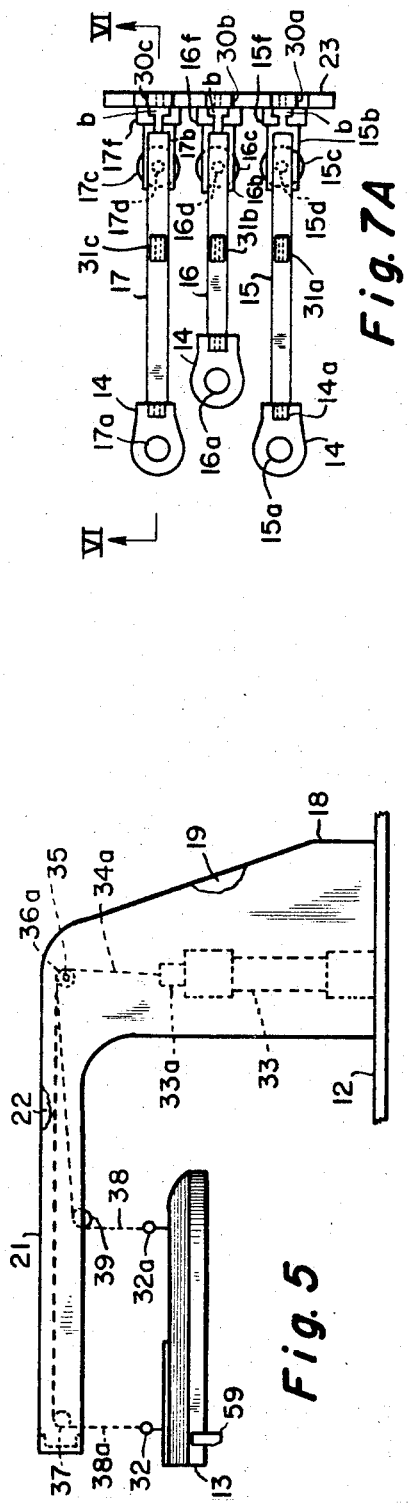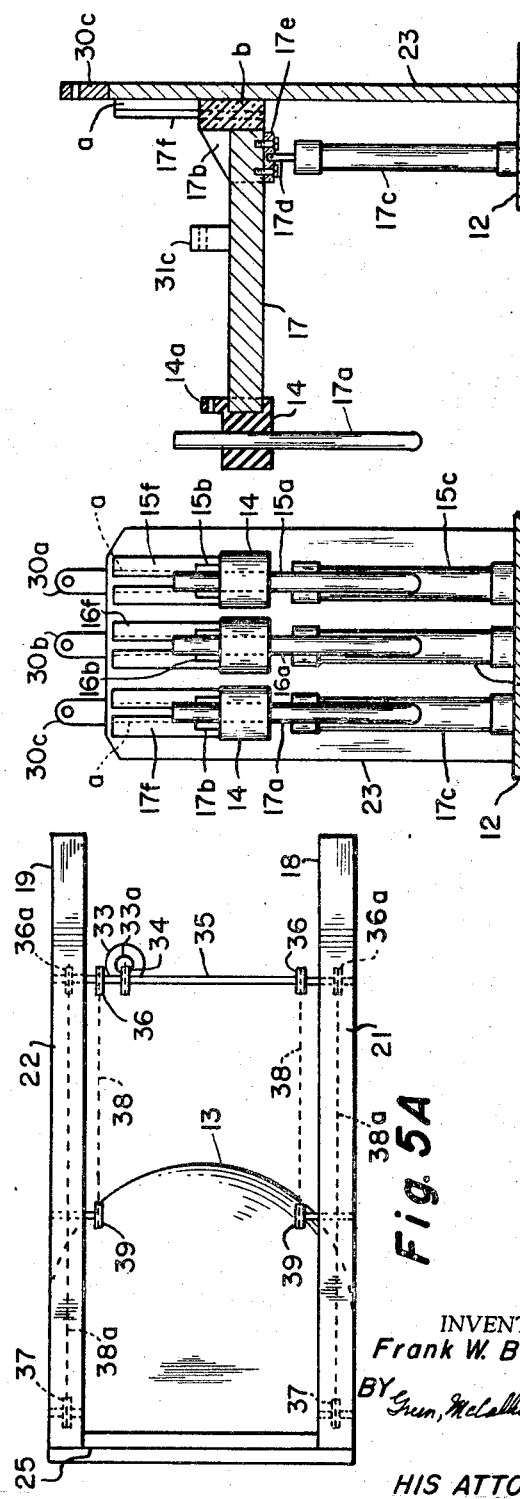

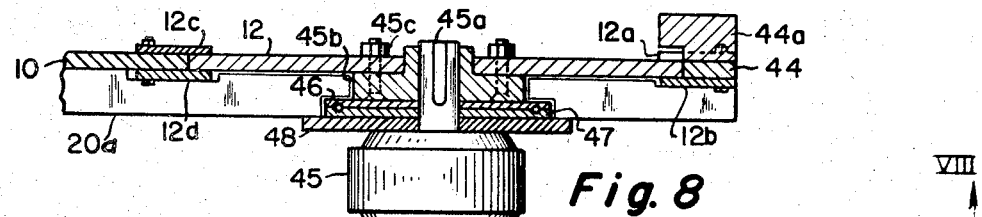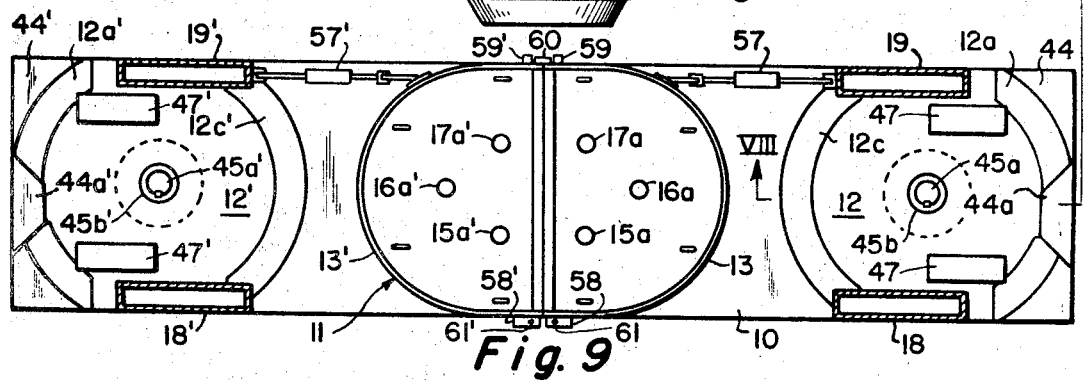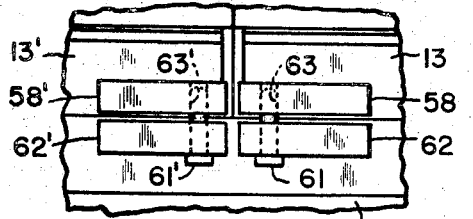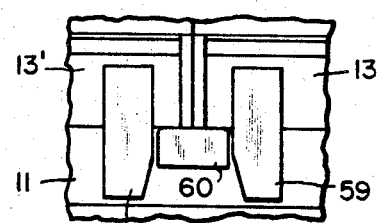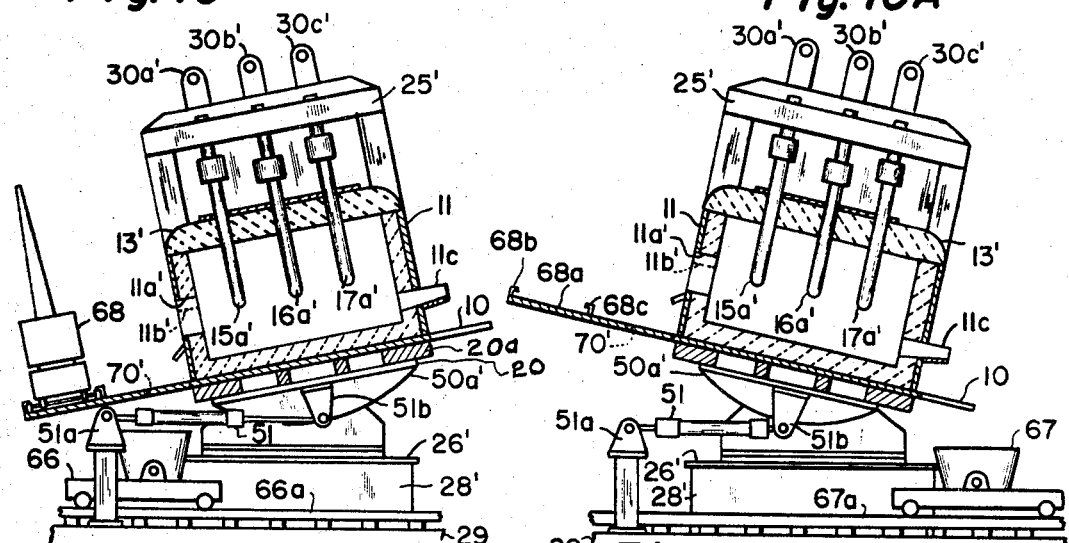

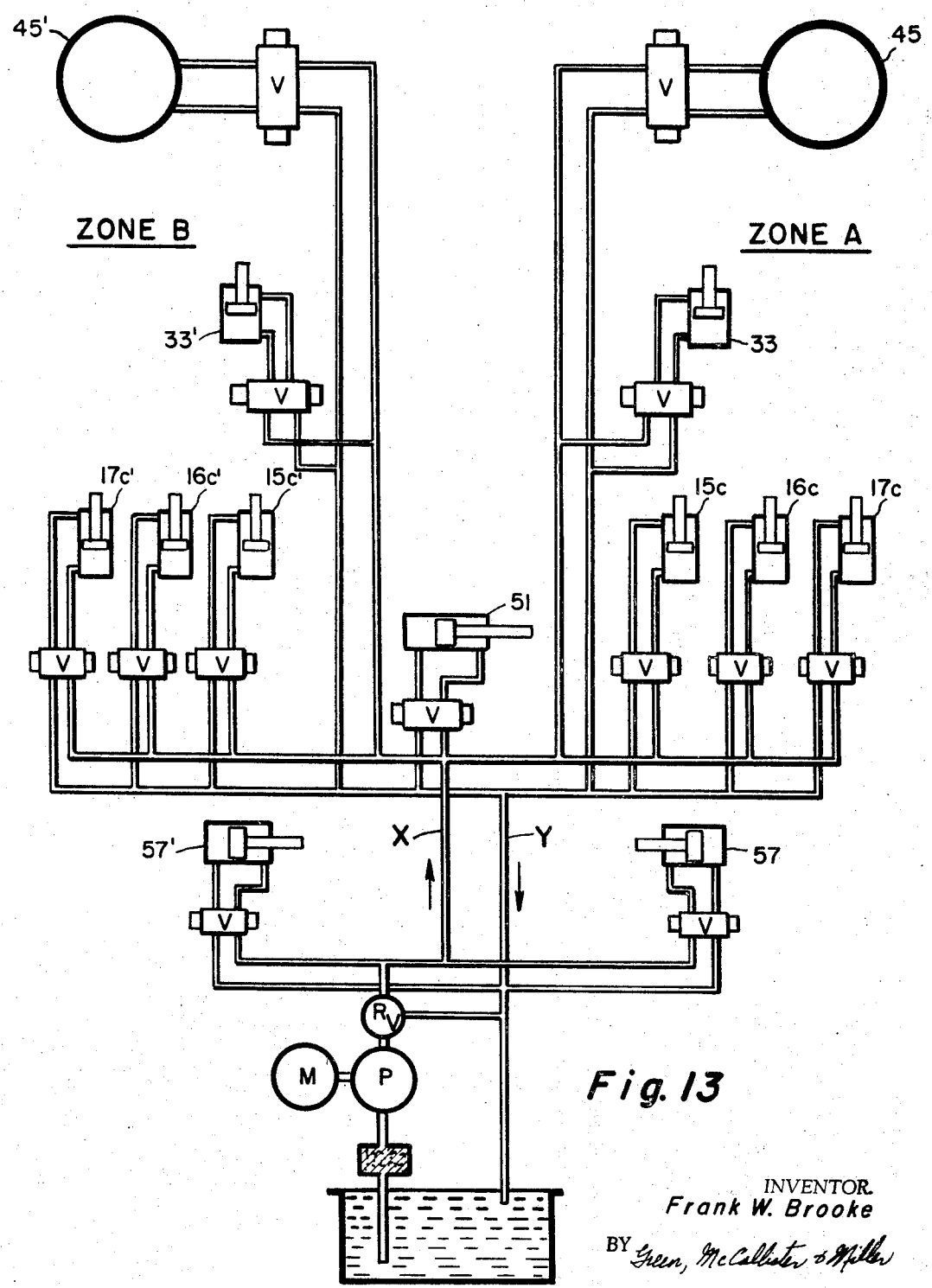

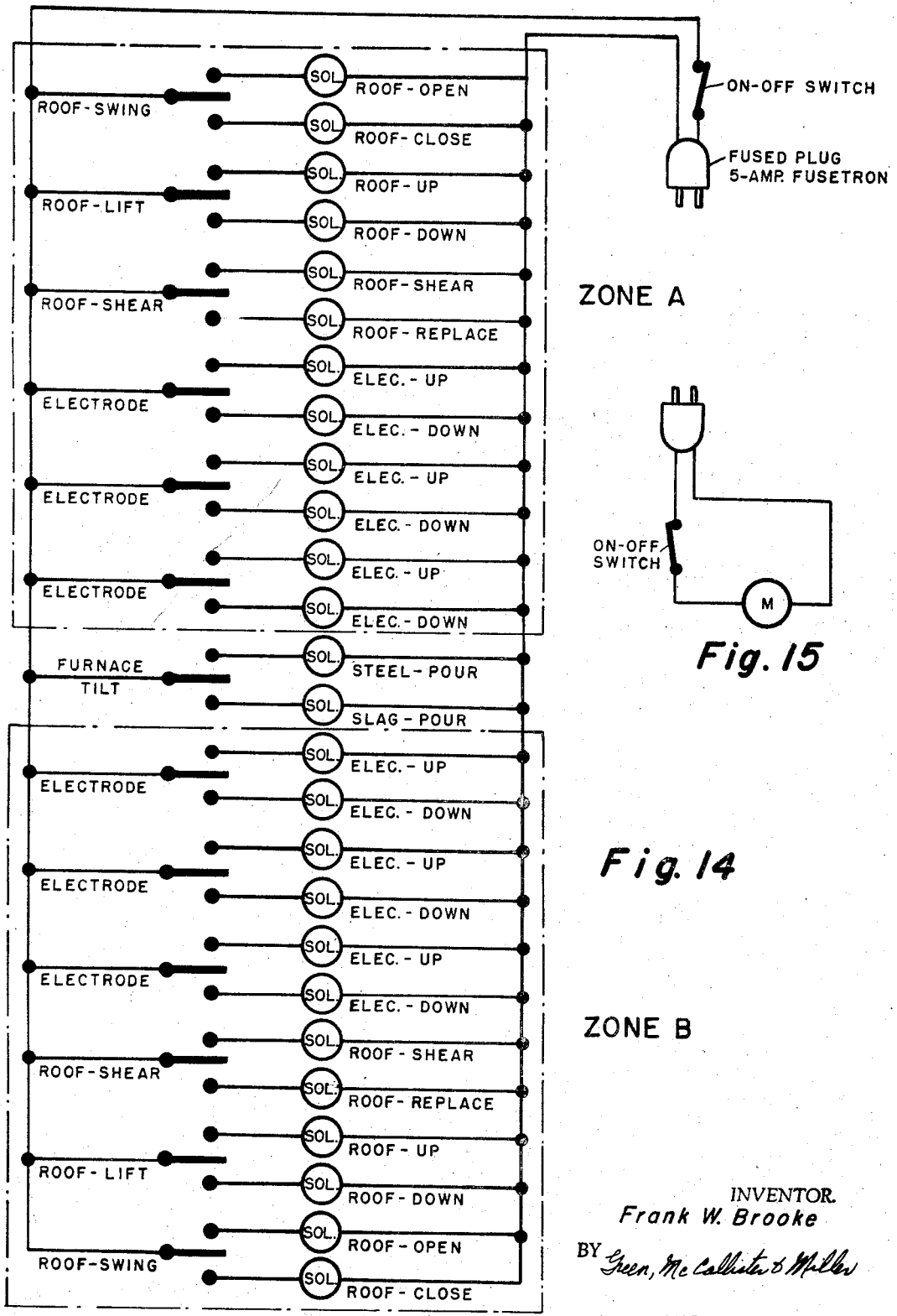

United States Patent Office 3,404,209
Patented Oct. 1, 1968

3,404,209
FURNACE CONSTRUCTION AND UTILIZATION
Frank Wharton Brooke, King Edward Apartments,
Pittsburgh, Pa. 15213
Filed May 25, 1965, Ser. No. 458,620
15 Claims. (Cl. 13—10)

ABSTRACT OF THE DISCLOSURE

An arc furnace for continuous melting of metals and alloys having a sectioned roof. Each section has its own electrical equipment and is suspended separately to swing-away for charging materials after which the section is re-aligned to an operating position. Meanwhile heat generation proceeds in the closed off section so that pouring and slagging may be accomplished without interruption of the heat. The furnace roof sections, their handling and electrical equipment are all arranged in a balanced relation with respect to each other.

---

This invention pertains generally to melting furnace installations and particularly, to a new and improved electric furnace construction and utilization. A phase of my invention deals with a new concept in electric arc melting furnace apparatus and its method of operation.

For well over a half of a century, I have been actively engaged in the development and improved processes and new apparatus for the basic metal industries. In the decade past, as I detected the vast potential need for higher quality steels and exotic alloys by a technically-oriented society, I have particularly channeled by research to the creation of improved procedures and apparatus for this area of metal refining and production.

The improved procedure and apparatus set forth in my Patent No. 3,147,107 makes it possible for the industry to realize a "fly-wheel" or continuous means of charging prepared materials into a group of furnaces. As pointed out in the patent, there is a need for a furnace construction which will be capable of handling the output of a substantially continuous raw material supplying operation.

My present invention has thus resulted from my work in endeavoring to meet the need for a furnace suited to a plant layout or system for utilizing pre-conditioned charge materials and for better utilizing a substantially continuous supply of raw materials. I have recognized that such a furnace should not only be capable of efficiently utilizing prepared charges, but should also be capable of beneficial employment in the general field of furnace melting operations. Thus, the invention is not only directed towards the removal of a potential "bottleneck" in the utilization of preconditioned charging materials, but also provides a new and practical answer to the "down-time" problem inherent in the operation of conventional electric furnaces.

Heretofore, furnace operators have sought in vain for a method of making steel by an electric furnace in which the charging period would not necessitate interruption of the "heat" and the complete removal of all electrical equipment from the interior of the furnace. I have observed that there is often a long, expensive, and annoying delay between successive "heats" while electrodes are changed or adjusted as requirements dictate. I have further found that there are inherent problems of weight and balance associated with present means utilized for suspending the electrode units over the roof of a conventional furnace. In addition, a top charge electric furnace which requires means to raise and lower the heavy roof, makes the problem of weight and balance even more complex. In operating a conventional electric furnace, it has been necessary to stop the generation of heat, and to raise the electrodes to a considerable height to clear the furnace area before the furnace is charged. This requirement further increases production costs, not only because of the time required for raising the furnace roof and the electrodes, but principally because it interrupts the melting operation and results in a comparatively cold furnace. Consumption of time and electrical energy, both expensive commodities are involved in reheating the furnace.

It has never before been considered feasible to design and construct a substantially continuously operating direct-arc furnace for steel making. Operators have sought in vain for a method of making steel by electric means in which heat can be generated within the furnace during repeated charging with raw materials and during repeated pouring of the molten steel and slag therefrom, as a sequential part of the operation.

It has thus been an object of my invention to meet the factors involved in providing what may be termed a continuous furnace melting operation and particularly, from the standpoint of meeting the problem involved in effectively and efficiently so utilizing an electric melting furnace.

Another object of my invention has been to provide a furnace installation that can be charged with materials during generation of heat within the furnace, and that will avoid the need for fully removing electrical equipment from within the furnace during the charging period.

Another object of my invention has been to provide an electric furnace installation wherein electrodes can be changed without requiring a delay between successive "heats."

A further object has been to provide an electric furnace construction having improved means for balance and weight distributioin as to the suspension of the roof and electrodes associated therewith.

A still further object has been to provide a furnace installation that can be maintained at an operating temperature between succssive taping operations, and that will eliminate the need for reheating a comparatively cold furnace following each pouring operation.

A further object has been to provide a furnace that is particularly suited to the preconditioning processes disclosed in my U.S. Patents Nos. 3,147,107 and 3,180,724.

These and other objects of my invention will appear to those skilled in the art from the illustrated embodiment and the claims.

The electric furnace structure which I provide involves a radical departure from the designs most familiar to the prior art. Generally, I prefer to provide an oval-shaped or horizontally-elongated, refractory-lined furnace which has a roof divided into at least half sections or parts. Separate electrical heating means in the form of a group of electrodes is adapted for use with and insertion through each roof half, section or part. Unlike conventional electric furnaces which have support structure for raising and lowering the roof and its associated electrical equipment or electrode group, contiguous to or affixed to the body of the structure, the support structure I provide for each roof part and the electrical heating means inserted therethrough does not depend on the rigidity of the furnace body or shell for its support. I prefer to provide identical support structures that are positioned opposite each other, one adjacent each end of the furnace.

The suspension of each roof part or half with its associated electrical equipment is achieved by utilizing vertical posts, pillars or booms having cantilever arms extended therefrom as booms over the centrally located furnace. The booms are adapted to extend towards each other over and in a spaced relation above the top portion of the furnace. Instead of employing the customary large vault or room adjacent to the furnace structure to house the step-down transformer that provides energy for the electrodes, each heavy roof half and its associated electrode group is counter-balanced by mounting a compactly designed energy source or means in the form of a transformer on the side of the supporting pillars and opposite the direction of extension of the booms or cantilever arms from which the roof half is suspended. The entire superstructure including the furnace with its endwise adjacent structure is positioned on a support table and constructed to tilt on a common horizontal axis. Support structure for each roof half and its associated electrodes is adapted to move or turn independently of the furnace, each on its own vertical axis, to facilitate the removal of each roof half and its associated equipment from the immediate operating vicinity or overhead area of the furnace. During the operation, one roof half with its associated electrical equipment may be in a swung-away position, while the other roof half may be positioned to cover its portion of the mouth or top of the furnace, with electrodes extending therethrough into the furnace melting and refining chamber and electrically energized to generate melting heat within the furnace.

In this manner, charging materials may be introduced through the open top or mouth half of the furnace while heat is being generated in the closed-off portion or half thereof. The entire superstructure may be tilted as a unit on its horizontal axis while all components that are collateral to the furnace remain in their same relative positions. Thus, pouring and slagging operations are possible without necessitating interruption or suspension of the "heat." Either one of the two sets of electrodes may be used while the opposite set is in a swung-away position; also, both sets may be utilized when they are in an operating position. Changes or adjustments as to one set of electrodes may be accomplished without interruption of the operation of the furnace.

In essence, I provide an apparatus that embodies desirable features of a cooperative utilization of a plurality of electric furnaces, and also eliminate adverse and limiting features commonly associated therewith.

Although the foregoing is a summary of some important characteristics of my inventive construction and the capabilities of its operation, it will be better understood from the following detailed description when read in connection with the accompanying drawings in which:

FIGURE 3 is a top plan view on the scale of and showing the roof parts in the position of FIGURE 2;

FIGURE 4 is a rear view in elevation on the scale of and showing the roof parts in the position of FIGURE 1;

FIGURE 5 is a fragmental detail in elevation on a slightly enlarged scale, showing support posts or booms of FIGURE 1 that are employed to raise the roof parts;

FIGURE 5A is a top end view on the scale of and showing the structure of FIGURE 5;

FIGURE 6 is a sectional detail in elevation on the scale of FIGURES 5 and 5A and taken on line VI—VI of FIGURE 7A, showing an electrode arm and its associated parts;

FIGURE 7 is an end view in elevation on the scale of and taken from the left of FIGURES 6 and 7A;

FIGURE 7A is a plan view on the scale of and of the structure shown in FIGURE 7;

FIGURE 8 is an enlarged fragmental section in elevation showing details of swing mechanism or turntable means, taken on line VIII—VIII of FIGURE 9; this view shows means for rotating or turning each end turntable on which support structure for a roof half and its associated electrode group is mounted;

FIGURE 9 is a plan view partially in section on the scale of FIGURE 8, showing details of the construction of the two part furnace roof of FIGURE 1 and showing the furnace and end positioned means carried on a common support table; it also discloses means for aligning roof portions or halves and for applying an initial-separation force to the roof parts or halves;

FIGURE 10 is an enlarged front fragment in elevation taken centrally of FIGURE 9, illustrating details of front-positioned roof aligning means shown in FIGURE 9;

FIGURE 10A is a rear fragment in elevation on the scale of FIGURE 10 and taken centrally of the structure of FIGURE 9, illustrating back-positioned roof aligning means;

FIGURE 11 is an end section in elevation on the scale of and taken on line XI—XI of FIGURE 1, showing the furnace tilted frontwardly for removal of slag; it also illustrates means for tilting the superstructure and a support table;

FIGURE 12 is a view of the apparatus of FIGURE 11 showing its superstructure and its support table tilted in an opposite or backward direction for pouring molten material or steel;

FIGURE 13 is a schematic illustration of an hydraulic system suitable for accomplishing mechanical motions for the operation of a furnace construction of my invention;

FIGURE 14 is a schematic representation of a centralized electrical control circuit system suitable for operating a furnace construction of my invention;

FIGURE 15 is a schematic of an electric circuit for operating a pump driving motor for providing hydraulic pressure in the system of FIGURE 15;

Figure 17:
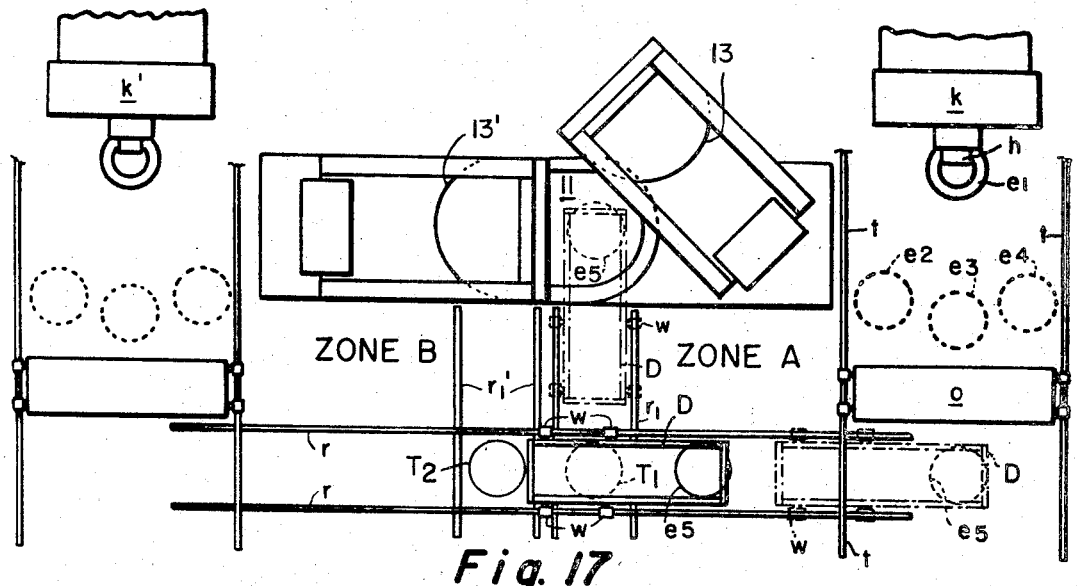

And, FIGURE 17 is also a diagrammatic view, showing an alternative layout.

Figure 1:
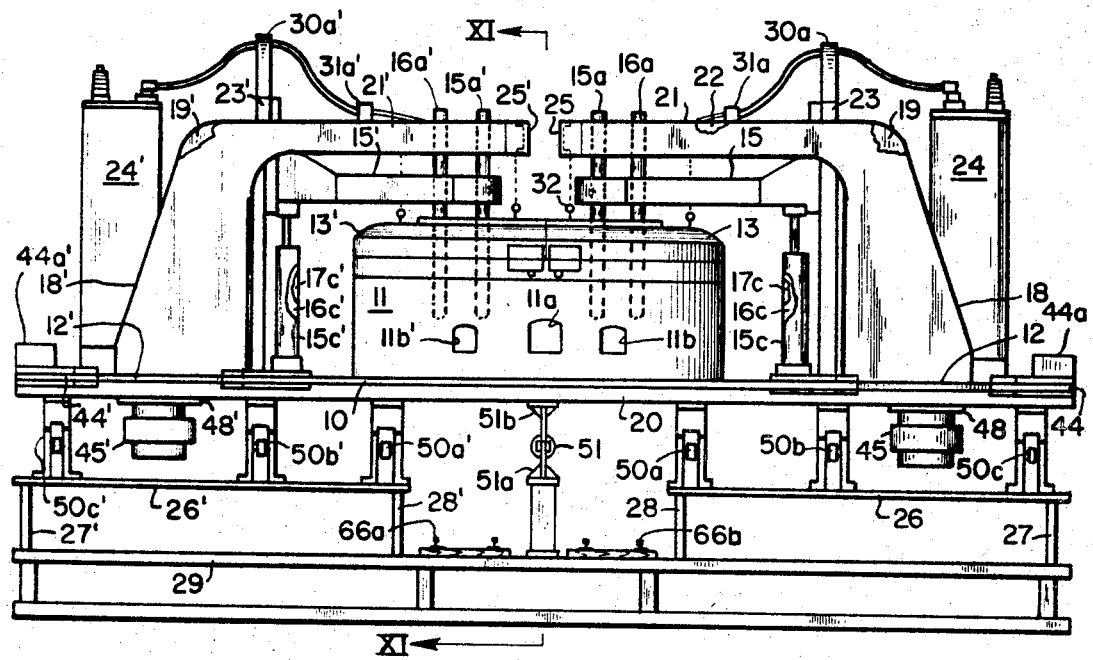
FIGURE 1 is a front elevation of a furnace installation embodying my invention in an operating position, showing its roof parts or halves closed.

In the construction of my invention illustrated in the drawings, parts that are components of mechanism and structure on the right side of a vertical center line of FIGURE 1 correspond to or are shown identical with parts on the left side. Thus, the same numerals are used to designate identical parts, but parts on the left side have been given prime suffixes.

In FIGURES 1 to 12, I have illustrated structural and operating features which exemplify a preferred embodiment of the invention. As viewed from the front elevation of FIGURE 1, the superstructure of the apparatus is shown supported by a longitudinally-extending rectangular, normally horizontal, under support platform 20 that carries a longitudinally-extending support table or normally horizontal platform 10 secured thereon. It will be noted that the support table 10 is mounted on the platform 20 by spacer members 20a (see FIGURE 11) in such a manner as to isolate the platform 20 from the heat of the furnace 11. The entire superstructure (see FIGURES 1 and 2) may be tilted on a longitudinal-horizontal axis by means of arcuate, tilt means or rockers 50a, 50b, 50c, 50a', 50b', and 50c', affixed transversely to the underside of the frame 20 of the support table 10 and spaced along its length. The table 10 carries the entire superstructure and has three main sections: a center support portion for a melting furnace 11, and two turntable or end parts or sections, 12 and 12', situated at opposite ends thereof. Each turntable or end section 12 and 12', in addition to being tiltable in unison with the support table 10, will each swing, turn or rotate on its own vertical axis.

The full length horizontal platform or primary support member or table 10 and its associated under platform 20 on which the entire superstructure rest is separated by the tilt means or arcuate rockers from a lower level, secondary and stationary platform. The lower level platform has two secondary platform parts 26 and 26' of equal length, each of which supports three of the six arcuate rockers which have their flanged lower ends securely fixed thereto. The two secondary platform parts, 26 and 26' are spaced at a distance from a lower longitudinal member 29 by means of vertical transverse risers 27, 28, 27' and 28'. By utilizing a two-part lower level platform, the central area between the two arcuate rockers 50a and 50a' situated nearest to the central portion of the support member 10, is open from the lower member 29 up to the lower surface of the under platform 20. This open area facilitates a coordination of functioning or operation of the construction with the functioning and operation of systems or apparatus such as disclosed in my Patents Nos. 3,147,107 and 3,180,724 (see FIGURES 16 and 17).

Actuating mechanism or motor means 51 for inclining the superstructure on its longitudinal axis is shown in FIGURE 1 and depicted in greater detail in FIGURES 11 and 12. The means 51 is illustrative of means for either tilting the structure backwardly to a metal pouring position or forwardly to a slag-removing position. Any suitable mechanism may be employed to tilt the superstructure, depending on the type of power available at the plant location. For example, electrical, steam, pneumatic or hydraulic power mechanism may be employed. The motor means 51 is shown as a hydraulic cylinder for forward and retracting movement. At a point directly beneath the center of the support table 10, the motor or cylinder 51 extends horizontally from a pivot mount 51a that is secured on an upright post. At its opposite or operating end, the motor 51 is provided with a piston rod that is pivotally connected at its end to a downwardly-projecting mount 51b. The mount 51b is secured centrally to the base of under support 20 (see FIGURE 11). As shown in FIGURE 13, the motor 51 is a double acting hydraulic cylinder having a control valve V to hold the superstructure in a predetermined position and to actuate it in either direction. Such a type of motor provides smoothness of movement and positive stopping.

Figure 2:
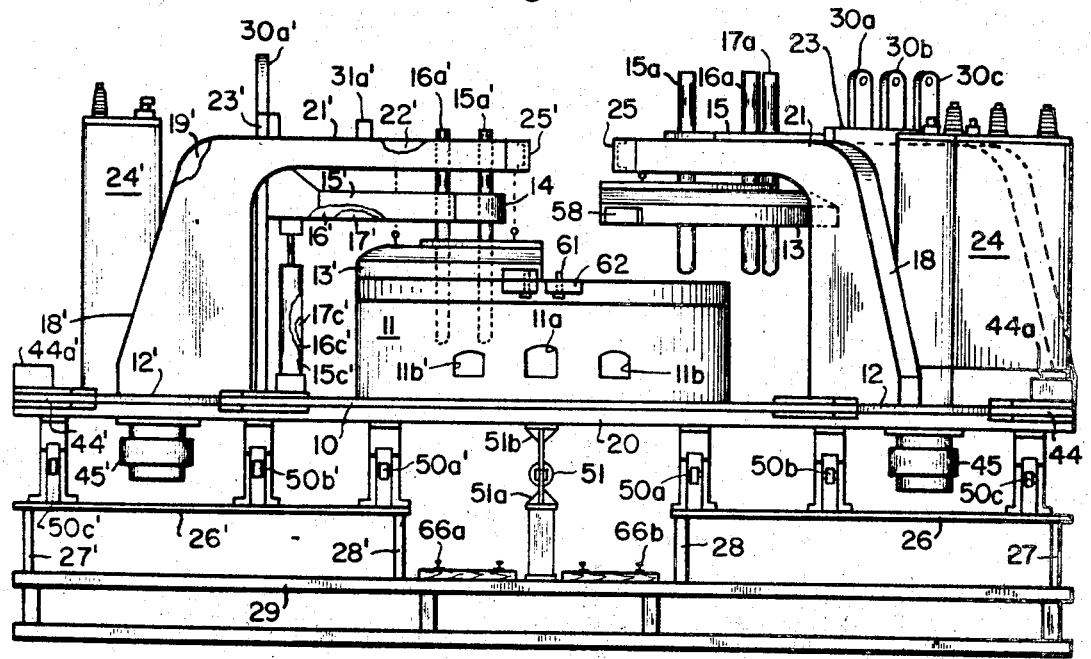
FIGURE 2 is a front elevation on the scale of FIGURE 1 showing another operational position, with one part of the roof in a raised position and swung away from overhead alignment with the furnace.

The predominant part of the construction, as particularly shown by FIGURES 1 through 3, is an elongated furnace 11, shown of oval shape. The roof is divided into partible or removable, refractory lined parts or halves 13 and 13' which meet at a center line across the open top or mouth portion thereof to close off the melting chamber defined by the body of the furnace 11. Each roof half is provided with holes therethrough for the insertion of an associated group of electrodes 15a, 16a and 17a or 15a', 16a' and 17a'. The furnace 11 is positioned on the support table 10 that is, in turn, positioned on the platform 20 that, as previously pointed out, is adapted to tilt for periodically removing molten material. The platform 20 and table 10 tilt on a horizontal axis that is parallel to their lengths. The turntables 12 and 12' adjacent each end of the furnace 11 are mounted for turning or rotatable movement on the support table 10 and platform 20, and are adapted to tilt in association with the support table. Each turntable 12 and 12' (see FIGURE 8) is mounted by means of a bearing assembly consisting of upper and lower disc-like bearing plates 46 and 47 and cooperating balls for rotation on a vertical axis.

Affixed to each turntable 12 or 12' are a pair of spaced-apart vertical support posts, pillars or booms 18 and 19 or 18' and 19' in the form of cantilever arms (see FIGURES 1, 2, 3, 4 and 9) that are interconnected by a back cross piece or member 23 or 23' and a front cross piece or member 25 or 25'. The booms, such as 18 and 19 have wide bases which converge upwardly to provide horizontal arms or inwardly-projecting boom portions, such as 21 and 22 that extend longitudinally over the furnace 11. The distance between boom pairs 21 and 22 (or 21' and 22') which are parallel to each other, is shown approximately the same as the width of the furnace 11. The length of the top arms or boom portions is such that they end slightly short of halfway across the top of the furnace 11.

Mounted on the turntable 12 or 12', near their ends most distant from furnace 11, are electrical energy sources in the form of step-down electric transformers 24 or 24' which supply current to two electrode groups; see the representative group 15a, 16a and 17a of FIGURE 7. Each transformer 24 or 24' is secured to project upright on its respective turntable 12 or 12'; its construction, positioning and weight distribution is such that it will effectively counterbalance the weight of a corresponding roof half 13 or 13' and its associated group of electrodes that are to be raised and lowered from the boom pairs 21 and 22 or 21' and 22'. It will be noted that the transformers 24 and 24' are positioned within the spacing between the respective pillars or booms 18 and 19 or 18' and 19', and that mechanism for raising and lowering the roof halves 13 and 13' and their associated electrodes is also positioned between the boom pairs.

For raising and lowering the roof halves 13 or 13', I have shown a group of vertically-positioned motors or hydraulic cylinders 15c, 16c and 17c or 15c', 16c' and 17c' that are secured on inner portions of the turntables 12 or 12' for raising and lowering electrode arms 15, 16 and 17 or 15', 16' and 17' (see FIGURES 1 to 4, 7, 7A and 9) that respectively carry electrodes 15a, 16a and 17a or 15a', 16a' and 17a'. The transverse cross member 23 or 23' that interconnects the boom pairs or portions 21 and 22 or 21' and 22' provides a support to which vertical guide channels or members 15f, 16f and 17f or 15f', 16f' and 17f' are secured and from which electrode-carrying arms 15, 16 and 17 or 15', 16' and 17' extend (see FIGURES 6, 7 and 7A). The vertical guide channels 15f, etc., have, as shown in FIGURE 7, T-shaped, longitudinally-vertically extending guide slots a. Each arms 15, 16 and 17 has a non-conducting slide block 15b, 16b and 17b at its inner end of insulation material (such as reinforced resin), and that is provided with a T-shaped central rib portion b. The rib portion b has a slide-mounted fit with the central guide slot a of an associated guide channel member 15f, 16f or 17f.

Extending below each of the electrode arms 15, 16 and 17 or 15', 16' and 17' and parallel to guide channels 15f, 16f and 17f are the vertically-positioned motors or hydraulic cylinders 15c, 16c and 17c. Each motor, such as 17c, has a piston rod 17d that is provided with a non-conducting or insulating mount 17e that is bolted (see FIGURE 6) to the bottom of the back end of an associated arm 17. The motor 17c thus supports the arm 17 in cantilever fashion; each motor thus provides means for individually raising and lowering the arm connected thereto and its associated electrode. The parts 17b and 17e serve to electrically insulate the arm 17 and its electrode from the other metal structure.

It will be noted by reference to FIGURES 6 and 7 that each electrode arm, such as 15, 16 and 17, may be raised and lowered independently with respect to each other or with respect to other electrodes of the same group. In addition, the means for raising and lowering electrode arms 15, 16 and 17, is entirely independent from the means used to raise and lower the corresponding roof half 13. The back cross piece or member 23 is an upright plate that is secured between pillars 18 and 19 on the turntable 12 (see FIGURES 6, 7 and 7A) to, through the agency of the channels 15b, 16b and 17b, vertically-slidably or movably carry the electrode arms 15, 16 and 17.

As before indicated, the arms 15, 16 and 17 have end parts or slide blocks 15b, 16b and 17b that are each provided with a vertically-extending T-shaped rib portion b that is adapted to slidably-ride within a central vertical grooved or slotted portion a of an associated guide track or channel 15f, 16f or 17f. Each arm 15, 16 and 17 is thus adapted to be raised and lowered on its horizontal plane by means of its own individual motor, as represented by hydraulic cylinders 15c, 16c and 17c. It will be noted that each motor, such as 17c of FIGURE 6, is adapted to raise and lower its associated arm 17 and electrode 17a and hold them in any desired position. It will also be noted by referring to FIGURE 1 that the cylinders 15c, 16c and 17c are spaced at a substantial distance from the furnace end wall as are the electric insulating parts 15e, 15f, 16e, 16f, 17e and 17f. Unlike electric furnaces of the prior art which have vertical support structure contiguous to the furnace wall, a feature of my present invention is that there is adequate space around the entire circumference of the furnace 11 to permit workmen to move conveniently immediately thereabout for inspecting its operation and servicing it.

Means for raising and lowering each roof half 13 and 13' is shown in FIGURES 5 and 5A. A motor or hydraulic cylinder 33 (or 33') is shown mounted between the pillars or booms 18 and 19 (or 18' and 19') and has a piston rod 33a (or 33a') that is connected by a chain or cable 34a (or 34a') to turn a drive winding drum or wheel 34 (or 34'). The drum 34 is secured on a cross shaft 35 that is journaled between boom portions 21 and 22. The drum 34 is adapted to rotate the shaft 35 on which a pair of inner driven drums or wheels 36 and a pair of outer driven drums or wheels 36a are secured. A pair of inner chains or cables 38 are secured at their outer ends to the drums 36 and interleave over a pair of forwardly-positioned inner pulleys or sprockets 39 to suspend an outer end portion of the lid or roof 13 by means of engagement with a pair of projecting roof hooks or eyes 32a. A pair of outer chains or cables 38a are secured at their outer ends to outer drums 36a and interleave over a pair of outer sprockets or pulleys 37 to suspend the lid or roof half or portion 13 adjacent its inner end by means of roof hooks or eyes 32. Each roof half 13 or 13' is thus suspended in a balanced relation from four spaced points on its top surface.

In FIGURE 8, a rotatable fluid motor 45 is shown mounted on a bottom plate 48 and as having a shaft 45a adapted to rotate a supporting, centrally-positioned annular collar 45b. It will be noted that the collar 45b is keyed on the shaft 45a and is secured by bolt and nut assemblies 45c to the underside of the turntable 12 for rotating it. Bearing disc 46 has a rotatable engagement with the bottom face of the collar 45b and disc 48 has a rotatable engagement with the bottom plate 48, such that relative movement is imparted between the bearing discs during rotative movement of the turntable 12. As shown in FIGURES 8 and 9, the turntable 12 is of somewhat rounded shape and has opposed curved or arcuate edge portions that are fitted within slot or groove portions provided by the support table 10. An inner curved edge portion of the turntable 12 is shown slidably positioned between a pair of opposed curved pieces or parts 12c and 12d that are secured by bolt and nut assemblies (see FIGURE 8) to the support table 10; an outer curved edge portion is slidably-positioned between a pair of opposed curved pieces or parts 12a and 12b that are spaced by a spacer part 44 and are secured by bolt and nut assemblies to an angle-shaped lug portion 44a of the support table 10. A simple turntable design is provided by way of demonstration, but many variations are possible to achieve a more sophisticated construction; by way of example, means of reducing friction may be provided to separate the sliding surfaces where the edge portions of turntable 12 slide in the slots or grooves. Suitable means has been provided for limiting the amount of clockwise and counterclockwise rotation of each turntable 12 (or 12') on its vertical axis. Such means is provided (see FIGURE 9) by upwardly-projecting stop blocks 47 (or 47') that are secured on the turntable 12 (or 12') to engage the lug portion 44a (or 44a').

An important feature of my invention is the novel method of removing and returning each roof half and its associated electrodes. A problem heretofore encountered with any electric furnace having a removable roof is that gases and particles in suspension in the high heat environment within the furnace tend to cause surface scale to build-up. This, in turn, will cause the roof to stick or adhere to the ridge of the furnace shell. In the present invention, means are provided to impart an impact or twisting motion to each roof half prior to accomplishing the roof raising operation, in order to "crack" or break the roof away from the furnace 11. Each roof half has its own means for this purpose. In FIGURE 9, I have shown motors in the form of hydraulic cylinders 57 and 57'. Each motor cylinder 57 and 57' has a fixed-rod at its outer end secured to the pillar 19 or 19' and a movable piston rod at its inner end that is adapted to abut against the shell of an associated roof half 13 or 13'. Either single or double action cylinders 57 and 57' may be employed, but the important stroke is the forward power stroke to pivot the associated roof half on an associated pivot pin 61 or 61' (see FIGURES 9 and 10) that is located on an opposite side or end portion of the associated roof half 13 or 13'.

Fixed to the front of the side wall or shell of the furnace 11, along its top edge at the central line where the roof halves 13 and 13' meet, are a pair of spaced-apart identical, oblong-shaped, lower blocks 62 and 62' (see FIGURE 10). A cooperating pair of spaced-apart upper blocks 58 and 58' are fixed at the roof halves 13 and 13' adjacent their front ends. A pivot pin 61 projects upwardly from block 62 to extend within a hole 63 in the block 58, and a pivot pin 61' extends in a like manner from the block 62' within a hole 63' in the block 58'. The roof halves 13 and 13' may be lifted out of and lowered into position on the furnace 11 by reason of a vertical slide "off" and "on" engagement of the blocks 58 and 58' with respect to the pins 61 and 61'. Also, since the piston rods of the motors 57 and 57' are not secured to the roof halves 13 and 13', the latter may be raised out of and lowered into a cooperating relation with the former.

The opposite (back) portions or sides of the roof halves 13 and 13' are provided with positive aligning means, see FIGURES 9 and 10A. In this connection, a central rectangular block 60 is secured to project from the furnace wall or shell and to cooperate with a pair of spaced-apart cooperating wedge blocks 59 and 59' that are secured to project from the shell of the respective roof halves 13 and 13'. The central block 60 is positioned between the downwardly-extending upper blocks 59 and 59' to act as a slide bar or alignment post, in order that when either roof half 13 or 13' is replaced on the furnace 11, the inclined lower corner of the respective blocks 59 or 59' will engage and slide along the adjacent edge of the block 60 and limit or stop the roof half at the desired position. It will be noted the roof halves 13 and 13' are first lifted out of position by the motors 33 and 33' (see FIGURES 5 and 5A and the positions of FIGURES 2 and 3). Conversely, in returning the roof halves 13 and 13' to sealing-off positions on the furnace and over its top open mouth portion, they are first swung back to an aligned overhead position and are then lowered in such a manner that the pins 61 and 61' of FIGURE 10 enter the holes 63 and 63' and the blocks 59 and 59' slide downwardly along the central block 60.

The positioning of transformers 24 and 24' for the electric melting operation is a novel feature of my invention. Operators of furnaces in the prior art have been restricted in their choice of the furnace location to the extent that it was necessary to place it in close proximity to a room or vault in which the transformer is housed. It is desirable to minimize electrical resistance in the circuitry between the secondary winding of a transformer and the electrodes. The greater the distance between the electrodes and the transformer, the heavier must be the interconnecting secondary cables. Also, in conventional furnace installations in which the transformer is housed in a separate, stationary location, allowance in cable length must be adequate to permit flexing and twisting when the furnace structure is tilted for pouring or slag removal.

In FIGURE 4, I have shown two transformers 24 and 24′, for example, of conventional three-phase construction, one for each group of electrodes 15a, 16a and 17a or 15a′, 16a′ and 17a′, mounted directly on the respective turntables 12 and 12′. The arrangement is such that the electrical leads are relatively short, the supporting structure for each electrode group is always in the same fixed position with respect to the associated transformer, and the associated transformer serves as a counter-balance for the roof half and the electrode group carried by the forwardly-projecting boom. Due to its closely adjacent cooperating position, each transformer 24 and 24′ requires only short leads or electric cables for supplying energy to the electrode group. Power losses in high voltage leads to the primary of each transformer are considerably less than lower voltage leads from their secondaries to the electrode groups, and I have been able to minimize the length of the secondary leads.

To maintain each secondary cable in parallel alignment with each other, guides 30a, 30b and 30c or 30a′, 30b′ and 30c′ are mounted on cross pieces 23 or 23′ (see FIGURES 1, 2, 4, 7 and 7A). Also, a second group of guides 31a, 31b and 31c or 31a′, 31b′ and 31c′ are mounted on the electrode supports arms 15, 16 and 17 or 15′, 16′ and 17′. The wire end of each cable is brazed to a lug 14a of a highly conductive (such as a copper or copper alloy) electrode support or clamping head 14. It will be noted that each arm 15, 16, 17, etc., is electrically insulated from the metal support structure by its slide block 15f, 16f, 17f, etc., which is of a suitable insulating material. Also, each piston rod 15d, 16d, 17d, etc., has an insulated connector end 15e, 16e and 17e, etc. (see FIGURE 6).

With the exception of the motor 51 (see FIGURES 11 and 12) that is employed to tilt the structure on its horizontal axis for pouring purposes, the various motor means may be considered as of two separate groups. One group imparts mechanical movement to the components of the supporting structure associated with one-half of the furnace 11, and the other identical group provides the various movements for the identical and opposite structure associated with the other half of the furnace 11. All of the motor means employed in the illustrated embodiment are fluid motors, and a single supply system may be utilized to provide fluid under pressure to all of the means. A diagrammatic layout for such a system is shown in FIGURE 13. The hydraulic system is shown as having two separate zones, Zone A and Zone B. Since the motor means in each zone is the same and the means of Zone B is distinguished by prime suffixes, reference to Zone A is sufficient. The motor 45 of Zone A is employed to rotate or turn the turntable 12, the motor 33 is employed to raise and lower the roof half 13, the motor 57 is employed to initially separate the roof half 13 from the other half 13′, and the motors 15c, 16c and 17c are employed to raise and lower or regulate the vertical positions of one group of electrodes 15, 16 and 17.

It will be noted from FIGURE 13 that a single fluid supply reservoir is provided, and a hydraulic pump P is actuated by electric motor M to provide fluid under pressure through branch lines to the various aforementioned means by way of a main positive pressure line or output conduit X. Return or negative pressure lines from each motor are connected to a main return line or conduit Y. A relief valve RV is connected between main lines X and Y to maintain a constant positive pressure in line X. Each motor means is provided with a control valve V for reversing the direction of positive fluid flow to each motor means, in order that each motor may be positively actuated in opposite directions for forward and backward movement. Each valve V has dual electric solenoids, in order that when one solenoid is energized the motor means will be actuated in one direction and when the other solenoid is energized, the motor means will be actuated in an opposite direction. In other words, each valve V is balanced to automatically close both lines to the associated motor when neither solenoid is actuated, and the energization of one solenoid connects the lines for fluid flow in one direction to and from the motor, and the energization of the other solenoid connects the lines for fluid flow in an opposite direction through the motor to reverse its direction.

In FIGURE 14, I have illustrated a control panel for electrically controlling the operation of my furnace construction. Solenoids with electric switches (such as of a push-button type) are shown in FIGURE 14 to correspond to the dual solenoid valves V of each Zone A and B and to the dual solenoid valve V for the tilt motor 51. FIGURE 14 shows the two separate zones of control, A and B that correspond to the opposite ends of the furnace, with the switch for actuating the furnace tilt between the two zones. Each switch is of a three-position type, namely: an "off" position, one contact position to one solenoid, and a second contact position with the other solenoid of the same valve. It will be noted from FIGURE 14 that a master "on" and "off" switch may be provided from a source of electric energy to the circuit. In FIGURE 15, I have shown an electric motor M for actuating the hydraulic pressure pump P of FIGURE 13. The pump P may be of a centrifugal or other suitable type.

No attempt has been made to include in the console system schematically shown in FIGURE 14 all the conventional means of control that may commonly be associated with a conventional furnace, thus FIGURES 13 and 14 diagrammatically illustrate only means particularly pertaining to my invention. It will be apparent to those skilled in the art that such means is only representative and that other means may be employed to carry out the novel operation of my construction.

Interlocking means may be provided (not shown) to prevent a roof half from being swung before its lift has been completed. Heavy equipment in motion requires the use of automatic safety devices wherever possible, and a reason for the showing of hydraulic means is because both acceleration and deceleration of a hydraulic motor can be accomplished with smooth and positive control. Smoothness of motion and response is particularly important in regard to mechanical movement of equipment of vast size and weight.

In employing a furnace construction of my invention, the furnace may be first charged with metal scrap and other raw materials. In FIGURE 3, the support table 10 to which the furnace 11 is affixed is shown provided with an apron extension 68a. Charges may be conveyed over and into the open furnace 11 or into one end of its melting chamber or compartment by a charging machine or self-powered crane 68. The machine 68 is shown positioned for linear movement parallel to the furnace on channel-shaped tracks 68b and 68c that are carried by the apron 68a. As shown in FIGURE 3, the wheels of the charging machine 68 fit within inwardly-facing open sides of the tracks 68b and 68c in such a manner that upper and lower flanges of the tracks guide the wheels and prevent the crane 68 from tilting, as when the furnace structure is inclined. Two sets of front tracks 66a and 66b are situated under the superstructure and extend perpendicular to the front side of the furnace 11. Also, one set of tracks 67a extend perpendicular to the back or rear side of the furnace. These tracks facilitate the use of metal slag and ladle cars 66 and 67, see also FIGURES 11 and 12.

Openings 11d and 11d′ in the rear side wall of the furnace 11, situated on either side of a metal pouring spout 11c, enable the use of stirring or rabbling equipment (see FIGURE 4). An inspection door 11a is shown centrally positioned between slag pouring spouts 11b and 11b′ at the front side of the furnace.

FIGURE 11 shows the furnace 11 in a forwardly-inclined position with a slag car 66 moved into a slag receiving position on the tracks 66a. Referring to FIGURES 2 and 3, I have shown a pair of slag removal or pour openings 11b and 11b', in order that slag may be poured down through the open portions 70 and 70' in the table 10, simultaneously into a pair of slag cars 66 positioned on tracks 66a and 66b. FIGURE 12 shows the furnace 11 in a backwardly-inclined molten metal pouring position. Molten metal may be thus poured through spout 11c into a ladle car 67 that has been moved into position on tracks 67a.

Figure 16:
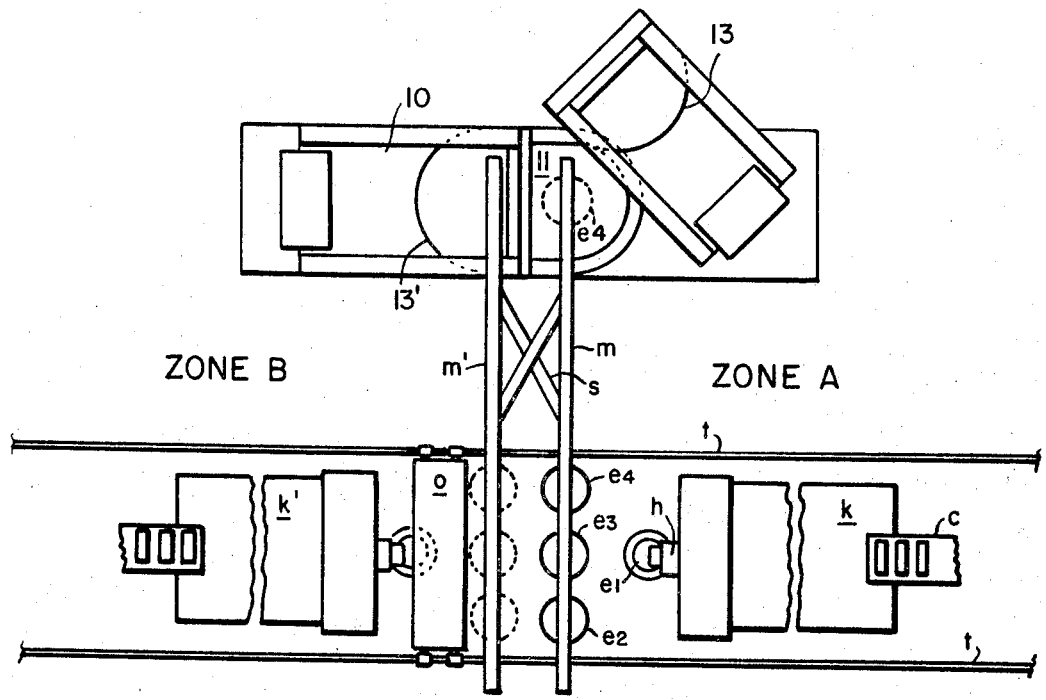
FIGURE 16 is a somewhat diagrammatic plan or layout showing a utilization of a furnace of my construction wherein charging material may be prepared as illustrated in my Patents Nos. 3,147,107 and 3,180,724; this view illustrates the employment of preconditioned charging materials that may be handled in their conditioning and holding containers.

In FIGURES 16 and 17, I have illustrated how a furnace construction of my invention may be cooperatively utilized with equipment or systems, such as set forth in my Patents Nos. 3,147,107 and 3,180,724. In accordance with such a utilization, pre-treated or heated charging materials, such as metal scrap or metal pellets, may be successively charged by means of containers into one side of the melting furnace while the other side is being operated. In this manner, the furnace can be employed in such a manner that preconditioned charging materials may be substantially continuously utilized as they are made available. In this connection, the containers have the capability of retaining the charges in their preconditioned or heated status until they are required for charging one side of the furnace. It is contemplated that the furnace may be operated substantially continuously, allowing for periodic removal of slag and the pouring of processed metal.

By way of example, in FIGURE 16, I have shown a layout that saves floor space and that may be used with one or a series of endwise-aligned furnace structures of my invention. Overhead monorails $m$ and $m'$ are provided in a side-by-side relation for moving containers such as $e_2$, $e_3$, $e_4$ from an area between two opposed kilns $k$ and $k'$, serviced by a gantry crane $o$. The gantry crane $o$ is shown positioned for longitudinal movement along trackway $t$. A conveyor $c$ is shown for supplying raw materials to the kiln $k$.

In FIGURE 17, I have shown another plant layout utilization of my invention which also contemplates the utilization of a preconditioned source of charging materials, such as materials provided by a kiln $k$ and a briquetting machine $h$. As distinguished from FIGURE 16, the arrangement shown in FIGURE 17 shows a system wherein the source of raw materials, such as the kilns $k$ and $k'$, are located at the ends of the furnace perpendicular thereto, rather than in front of the furnace and parallel thereto. Referring particularly to the charging of Zone A of FIGURE 17, the kiln $k$ is shown providing materials to a briquetting machine $h$ to fill holding container $e_1$. Containers $e_2$, $e_3$ and $e_4$ are containers that have been previously filled and are waiting for utilization; they may be carried to the dot and dash positions of FIGURE 17 by an overhead gantry crane $o$ operating on trackway $t$. The crane $o$ may be used to pick-up one of the filled containers in the holding zone, such as container $e_5$, and position it on a charging machine D, as indicated by the dot and dash position to the right of the figure. The machine D is then moved to the left on its track $r$ to the central, full-line position of the figure on its wheels $w$. At this position, a turntable $T_1$ raises the machine D and turns it 90° to place it on a forwardly or transversely extending track $r_1$. The charging machine D may then be moved to the charging position of FIGURE 17 to empty its container $e_5$ into the open end of the furnace 11. In this connection, it will be noted that the roof half 13 has been swung out of position to the right to uncover the one end of the furnace. The charging machine D may also be utilized with the left-hand supply source $k'$ or a charging machine (not shown) similar to D may be also used on the tracks $r$ to serve the left-hand kiln $k'$; turntable $T_2$ may be utilized to raise, turn and place it in an operating position on the second track $r_1'$ for charging the left side of the furnace when its roof 13' is swung out of position.

Although for purposes of illustration, I have shown preferred embodiments and utilizations of my invention, it will be apparent to those skilled in the art that various modifications and changes may be made without departing from its spirit and scope and that the furnace may be charged in any suitable manner by any conventional equipment.

What I claim is:

1. In an electric furnace construction, a furnace body defining a melting chamber therein and having an open top portion, a roof for closing off said open top portion having at least two roof parts, means for independently raising and lowering said roof parts into and out of closing-off positions with respect to said open top portion and for independently swinging said roof parts into and out of overhead alignment with said open top portion, and said roof parts and said open top portion having cooperating slidably-engaging means operating adjacent sides of said furnace body for guiding said roof parts into an aligned closing-off position with respect to said open top portion.

2. A furnace construction as defined in claim 1 wherein a group of melting electrodes is carried by each of said roof parts, and means is provided for raising and lowering each of said group of electrodes with respect to its associated roof part into and out of an operating position within the melting chamber.

3. A furnace construction as defined in claim 2 wherein a pair of means is mounted on said table in an opposed balanced relation for swinging each of said roof parts and its group of electrodes into and out of an overhead aligned relation with said open top portion when each said roof part is in a raised position.

4. In an electric furnace construction, an enclosing furnace body defining a melting chamber therein and having an open top portion, a roof having a pair of partible parts for closing-off said open top portion, energy supplying electrodes carried by each of said roof parts to project in an operating relation within the melting chamber, separate means for parting said roof and for separately raising and lowering its said parts into and out of a closing-off position with respect to said open top portion, a support table on which said furnace body is centrally mounted, said separate means being positioned on said table adjacent opposite ends of said furnace body, and said pair of partible parts and said furnace body having cooperating portions for aligning said parts with respect to each other and with respect to the open top portion.

5. An electric furnace construction as defined in claim 4 wherein, said support table has opposite extending end portions, said means for parting and raising and lowering said roof parts is carried on the extending end portions of said table, and counter-balancing means is positioned on the extending end portions of said table to counterbalance the weight of said partible parts when said parts are being raised and lowered by said means.

6. An electric furnace construction as defined in claim 5 wherein said counter-balancing means is electric transformer means for energizing said electrodes.

7. An electric furnace construction as defined in claim 5 wherein, turntable means is operatively-carried by said extending portions of said support table, and said means for parting and raising and lowering said roof is carried by said turntable means for swinging movement with respect to said furnace body.

8. An electric furnace construction as defined in claim 7 wherein said counter-balancing means is electric transformer means for energizing said electrodes and is carried by said turntable means.

9. An electric furnace construction as defined in claim 7 wherein, a secondary support is positioned beneath said support table, and tilting means is carried by said secondary support and operatively-connected to carry said support table thereon for tilting said support table and said furnace body and said means carried thereby forwardly and backwardly with respect to said secondary support.

10. In a furnace construction, an elongated furnace body defining a melting chamber therein and having an open top portion, a support table carrying said furnace body thereon, a furnace roof for closing-off said open top portion, a boom carried on said table and projecting over said open top portion, operating means carried by said boom for raising and lowering said roof into and out of a closing-off position with said open top portion, and means for energizing said furnace carried on said table in an opposite counter-balancing position with respect to said boom to balance the weight of said roof during the raising and lowering movement thereof.

11. A furnace construction as defined in claim 10 wherein, electrodes are carried by said roof for supplying heat to the melting chamber, and said counter-balancing means is an electric transformer for supplying electric energy to said electrodes.

12. A furnace construction as defined in claim 11 wherein, a support structure is provided for said support table, tilting means is carried by said support structure and connected to said table for tilting said table and simultaneously tilting said furnace body, said roof, said boom and said transformer as a unit therewith.

13. In a furnace construction, an elongated furnace body defining an elongated melting chamber therein and having an open top portion, a roof for closing off said open top portion, said roof having a pair of cooperating roof parts, a support table carrying said furnace body substantially cenrally thereon, ap air of booms carried on said table adjacent opposite ends of said furnace body and projecting in an overhead relation towards each other and over said open top portion, means carried by one of said booms and connected to one of said roof parts for raising and lowering it into and out of a closing-off position with respect to said open top portion, and means carried by said other boom and connected to the other of said roof parts for raising and lowering it into and out of a closing-off position with said open top portion independently of said one roof part.

14. A furnace construction as defined in claim 13 wherein, a secondary support structure is positioned beneath said support table, and tilt means is carried by said secondary support structure and is operatively-connected to said support table for tilting said table backwardly and forwardly.

15. A furnace construction as defined in claim 13 wherein, a pair of turntables are operatively-carried by said support table adjacent opposite ends thereof, and said booms are directly carried on said turntables for swinging said roof parts into and out of an overhead aligned relation with respect to said open top portion.

References Cited
UNITED STATES PATENTS

| | | | |
|---|---|---|---|
| 1,735,419 | 11/1929 | Brooke | 13—10 |
| 2,271,045 | 1/1942 | Schuler | 13—9 X |
| 2,396,663 | 3/1946 | Kuehlthau | 13—10 |
| 2,766,736 | 10/1956 | Del-Buono | 13—9 X |
| 2,801,156 | 7/1957 | Udy | 13—9 X |
| 2,868,860 | 1/1959 | Foyn et al. | 13—9 |

FOREIGN PATENTS

| | | |
|---|---|---|
| 575,478 | 5/1959 | Canada. |

BERNARD A. GILHEANY, *Primary Examiner.*

H. B. GILSON, *Assistant Examiner.*